United States Patent
Gill et al.

(10) Patent No.: US 9,746,593 B2
(45) Date of Patent: Aug. 29, 2017

(54) PATCHWORK FRESNEL ZONE PLATES FOR LENSLESS IMAGING

(71) Applicant: Rambus Inc., Sunnyvale, CA (US)

(72) Inventors: Patrick R. Gill, Sunnyvale, CA (US); David G. Stork, Portola Valley, CA (US); Jay A. Endsley, San Jose, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 14/458,179

(22) Filed: Aug. 12, 2014

(65) Prior Publication Data

US 2015/0219808 A1 Aug. 6, 2015

Related U.S. Application Data

(60) Provisional application No. 61/988,161, filed on May 3, 2014, provisional application No. 61/871,124, filed on Aug. 28, 2013.

(51) Int. Cl.
*G02B 5/18* (2006.01)
*H04N 5/225* (2006.01)

(52) U.S. Cl.
CPC .......... *G02B 5/1842* (2013.01); *H04N 5/2254* (2013.01)

(58) Field of Classification Search
CPC ........ G01J 1/0414; G01J 3/021; G01J 5/0809; G02F 1/0311; G03F 7/70191; G03F 7/70308; G11B 7/1367; H01J 2237/2614; G01T 1/295; G02B 5/1876; G02B 5/1885; G02B 5/189; G02B 5/1895; G02B 27/44; G02B 5/18; G02B 5/188; G02B 5/1842; H04N 5/2254

See application file for complete search history.

(56) References Cited

U.S. PATENT DOCUMENTS

| | | | | |
|---|---|---|---|---|
| 3,263,088 | A * | 7/1966 | Goldfischer | B64G 1/361 250/203.6 |
| 5,633,735 | A * | 5/1997 | Hunter, Jr. | B23K 26/067 219/121.68 |
| 5,986,758 | A * | 11/1999 | Lyons | G01J 3/02 356/326 |
| 6,046,859 | A | 4/2000 | Raj | |

(Continued)

OTHER PUBLICATIONS

Conger et al., Synthesis of Fresnel Diffraction Patterns by Overlapping Zone Plates, Apr. 1968, Applied Optics, vol. 7, No. 4, pp. 623-624.*

(Continued)

*Primary Examiner* — Albert Cutler
(74) *Attorney, Agent, or Firm* — Silicon Edge Law Group LLP; Arthur J. Behiel

(57) ABSTRACT

Described are imaging devices that employ patchworks of diffractive structures as focusing optics. Each diffractive structure best focuses light over a relatively narrow cone of incident angles, and provides suboptimal focusing for incident angles outside that cone. Different diffractive structures best focus different angular ranges, with the patchwork thus providing an overall focusable response for the relatively broad range of angles required to image a scene. Images can be captured without a lens, and cameras can be made smaller than those that are reliant on lenses and ray-optical focusing.

10 Claims, 14 Drawing Sheets

(56) References Cited

U.S. PATENT DOCUMENTS

| | | | |
|---|---|---|---|
| 6,740,881 B2 | 5/2004 | Malmin | |
| 7,502,178 B2* | 3/2009 | Shenderova | G02B 5/1842 359/619 |
| 8,144,376 B2 | 3/2012 | Zomet et al. | |
| 8,179,578 B2 | 5/2012 | Rosen et al. | |
| 2012/0193517 A1 | 8/2012 | Zickler et al. | |
| 2012/0300301 A1 | 11/2012 | Ando et al. | |
| 2014/0267848 A1* | 9/2014 | Wu | H04N 9/045 348/277 |
| 2015/0185486 A1* | 7/2015 | Goldberg | G03H 1/08 359/19 |

OTHER PUBLICATIONS

Henry H. M. Chau, Properties of Two Overlapping Zone Plates of Different Focal Lengths, Feb. 1970, Journal of the Optical Society of America, vol. 60, No. 2, pp. 255-259.*

Guerineau et al., "Generation of Achromatic and Propagation-Invariant Spot Arrays by Use of Continuously Self-Imaging Gratings," vol. 26, No. 7, Apr. 1, 2001. 3 pages.

Horisaki et al., "Regularized Image Reconstruction for Continuously Self-Imaging Gratings," vol. 52, No. 16, Jun. 1, 2013. 10 pages.

Piponnier et al., "Relevance of Continuously Self-Imaging Gratings for Noise Robust Imagery," vol. 37, No. 17, Sep. 1, 2012. 3 pages.

Gill et al., "Lensless Ultra-Miniature Imagers Using Odd-Symmetry Spiral Phase Gratings," article presented at Computational Optical Sensing and Imaging (COSI), Arlington, Virginia, Jun. 23-27, 2013. 3 pages.

Gill et al., "Lensless Ultra-Miniature Imagers Using Odd-Symmetry Spiral Phase Gratings," slide deck presented at Computational Optical Sensing and Imaging (COSI), Arlington, Virginia, Jun. 23-27, 2013. 18 pages.

Calabuig et al., "Generation of Programmable 3D Optical Vortex Structures Through Devil's Vortex-Lens Arrays," Applied Optics, vol. 52, No. 23, Aug. 10, 2013, pp. 5822-5829. 8 pages.

Calatayud et al., "Fractal Square Zone Plates," Optics Communications, vol. 286, 2013, pp. 42-45. 4 pages.

Calatayud et al., "Twin Axial Vortices Generated by Fibonacci Lenses," Optics Express, vol. 21, No. 8, Apr. 22, 2013, pp. 10234-10239. 6 pages.

Ferrando et al., "Cantor Dust Zone Plates," Optics Express, vol. 21, No. 3, Feb. 11, 2013, pp. 2701-2706. 6 pages.

Kirz et al., "Zone Plates," Section 4.4 of X-Ray Data Booklet, Rev. 3, 2009, pp. 4-27-4-31. 5 pages.

Monsoriu et al., "Bifocal Fibonacci Diffractive Lenses," IEEE Photonics Journal, vol. 5, No. 3, Jun. 2013. 7 pages.

Skinner, G. K., "Diffractive-Refractive Optics for High Energy Astronomy: II. Variations on the Theme," Astronomy & Astrophysics, vol. 383, 2002, pp. 352-359. 8 pages.

Garcia-Martinez et al., "Generation of Bessel Beam Arrays Through Dammann Gratings", Mar. 20, 2012, vol. 51, No. 9, Applied Optics. pp. 1375-1381. 7 Pages.

\* cited by examiner

PATCHWORK FRESNEL ZONE PLATES FOR LENSLESS IMAGING

CROSS-REFERENCE TO RELATED APPLICATIONS

This application is related to the following applications, each of which is incorporated by reference:

1. U.S. patent application Ser. No. 14/184,978, issued 18 Aug. 2015 as U.S. Pat. No. 9,110,240, entitled "Phase Grating with Odd Symmetry for High-Resolution Lensed and Lensless Optical Sensing," filed by Patrick R. Gill and David G. Stork on Feb. 20, 2014 (hereafter "Gill and Stork");

2. U.S. Patent Application Ser. No. 61/870,468 entitled "Optical Sensing of Nearby Scenes with Tessellated Phase Anti-Symmetric Phase Gratings," filed by Patrick R. Gill and David G. Stork on Aug. 27, 2013;

3. U.S. Patent Application Ser. No. 61/944,034 entitled "Optical Flow Sensing and Pattern Recognition with Anti-symmetric Phase Gratings," filed by Patrick R. Gill, David G. Stork, and Patrick Johnstone on Feb. 24, 2014; and 4. International Patent Application Serial No. PCT/US14/19976 entitled "Phase Gratings with Odd Symmetry for High-Resolution Lensless Optical Sensing," filed by Patrick R. Gill and David G. Stork on Mar. 3, 2014.

BACKGROUND

Optics used to image a faraway scene can be thought of as performing mathematical operations transforming light intensities from different incident angles to locations on a two-dimensional image sensor. In the case of focusing optics, this transformation is the identity function: each angle is mapped to a distinct corresponding point on the sensor. When focusing optics are impractical due to size or material constraints, the right diffractive optic can perform an operation on light from incident angles other than the identity function that is nonetheless transformable to an approximation to the identity function mathematically. In such cases the sensed data may bear little or no resemblance to the captured scene; however, an image (or, more generally, a desired optical discrimination) can still be computed from the sensor outputs.

BRIEF DESCRIPTION OF THE DRAWINGS

The present invention is illustrated by way of example, and not by way of limitation, in the figures of the accompanying drawings and in which like reference numerals refer to similar elements and in which:

FIG. 12 depicts an imaging system 1200 similar to imaging system 1000 of FIGS. 10 and 11, with like-identified elements being the same or similar.

DETAILED DESCRIPTION

This disclosure details imaging devices that employ patchworks of diffractive structures as focusing optics. Each diffractive structure preferably best focuses light over a relatively narrow cone (or pair of cones) of incident angles, and provides suboptimal focusing for incident angles outside that cone or cones. Different diffractive structures best focus different angular ranges, with the patchwork thus providing an overall focusable response for the relatively broad range of angles required to image a scene. As detailed below, the diffractive structures can be adjacent or overlapping portions of Fresnel zone plates.

Figure 1A:
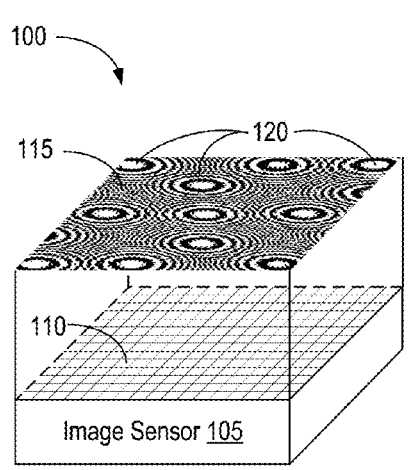
FIG. 1A depicts an imaging device 100 in accordance with one embodiment.

FIG. 1A depicts an imaging device 100 in accordance with one embodiment. Device 100 includes an image sensor 105, a two-dimensional array of photoelements 110. A grating 115 overlying sensor 105 includes adjacent and generally dissimilar diffractive structures 120 (although some may be rotations or symmetric functions of others), each of which includes concentric ellipses that encompass an area in a plane parallel to the sensor array that is at least ten times that of each underlying photoelement 110.

Image sensor 105 can be e.g. a charge-coupled device (CCD) or CMOS sensor. Each photoelement 110 resolves a location of photon arrival. Light from the diffractive structures propagates through a light-transmissive medium, such as lanthanum dense flint glass. In this embodiment, the light-transmissive medium allows light incident multiple diffractive structures 120, but with different distributions of arrival angles, to impinge upon the same one of photoelements 110.

Figure 1B:
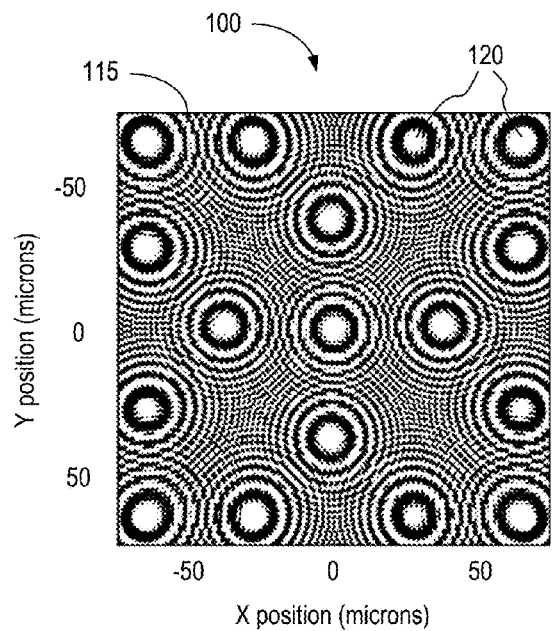
FIG. 1B depicts device 100 from a perspective normal to grating 115.
Figure 1C:
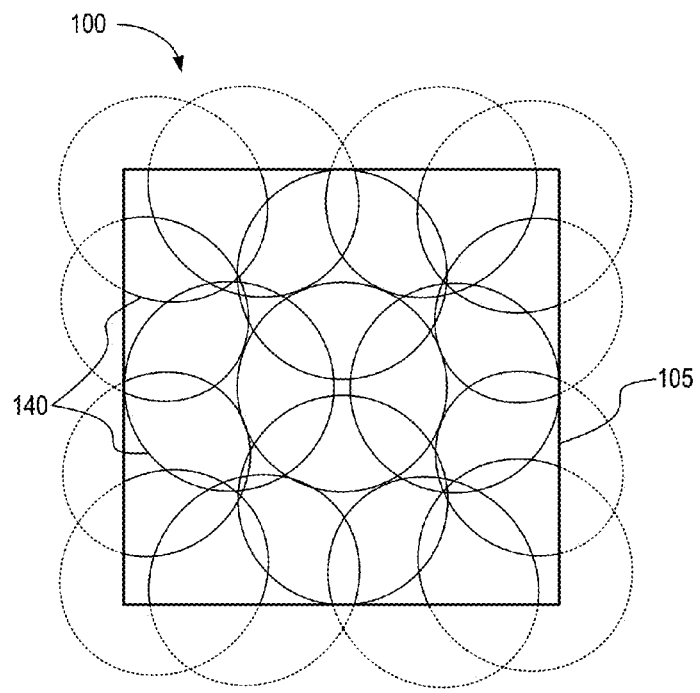
FIG. 1C depicts device 100 as overlapping ellipses 140, each of which represents the outer boundaries of one of diffractive structures 120.

FIG. 1B depicts device 100 from a perspective normal to grating 115. From this perspective, grating 115 can be seen to include seventeen overlapping diffractive structures 120. FIG. 1C depicts device 100 as overlapping ellipses 140, each of which represents the outer boundaries of one of diffractive structures 120. Structures 120 at the periphery of device 100 form partial ellipses, with the excluded portions of their boundaries represented using dashed lines. Diffractive structures 120 are partial Fresnel phase plates in this example, although other examples may use full Fresnel zone plates. Fresnel phase and zone plates are well known, so a detailed treatment is omitted here for brevity; however, a brief description will elucidate the following discussion.

Figure 2:
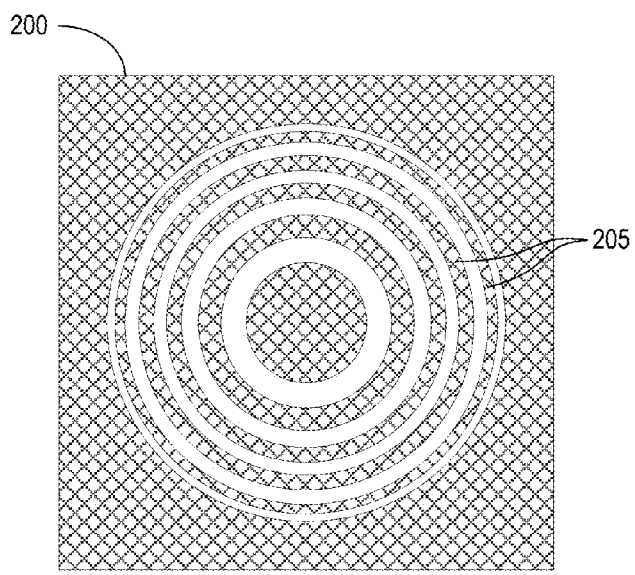
FIG. 2 (prior art) shows plan and perspective views of a Fresnel zone plate 200, an amplitude grating in this example.
Figure 2:
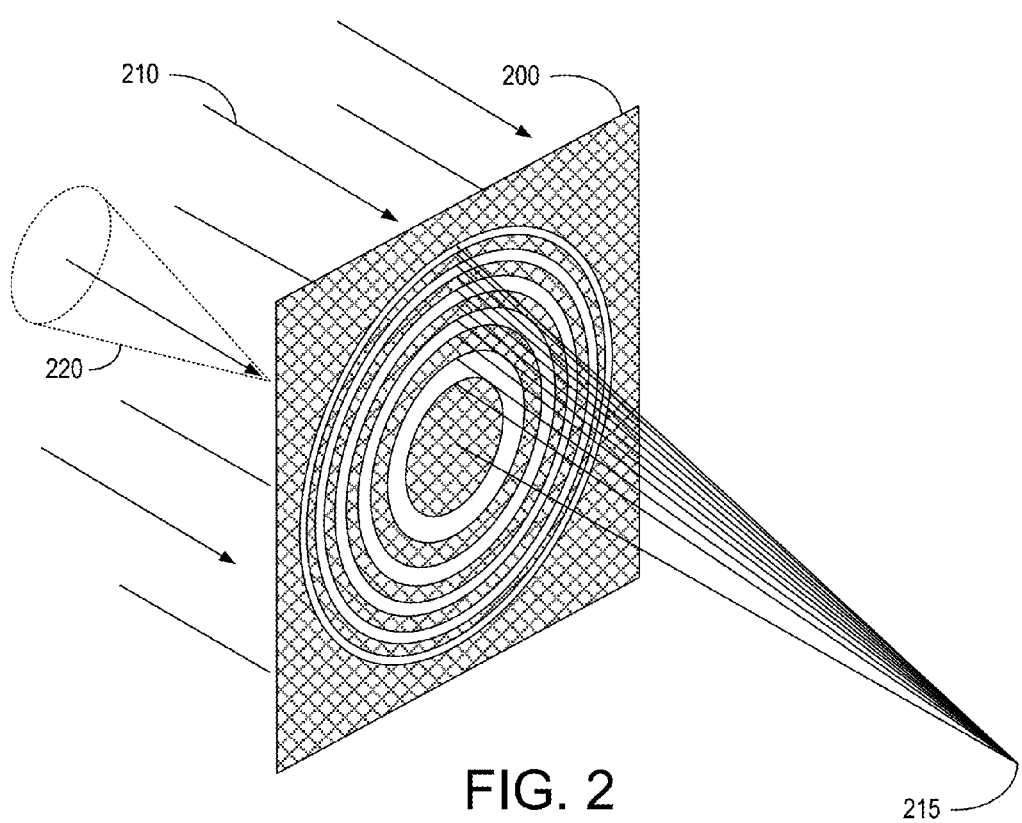

FIG. 2 (prior art) shows plan and perspective views of a Fresnel zone plate 200, an amplitude grating in this example. Zone plate 200 includes rings 205, or "zones," that alternate between opaque and transparent with radially increasing line density. Zone plate 200 is replaced by a phase grating in other embodiments, in which case, the dark and light portions represent height differences that produce constructive and destructive interference (in this example, binary phase differences of approximately half a wavelength are generated by the height differences; other examples may use continuous or more finely discretized height differences). Whether by amplitude or phase differences, plate 200 can focus light 210 incident plate 200 from the direction shown by diffracting the light to a desired primary focus 215.

To make an imaging device using one phase plate 200, it is sufficient to calculate the interference fringes between a point source on the underlying image-sensor plane and an incident plane wave of a wavelength of interest and the angle of incidence centered on a cone 220 of incident angles. Thus fashioned, phase plate 200 will produce a reasonably sharp focus at the image sensor for all incident angles sufficiently close to the incident angle of the plane wave and a single design wavelength. One advantage of the partial phase plates described in the embodiments below is reduced sensitivity to wavelength, because a subgroup of rings can be selected that focuses sufficiently well for a range of wavelengths. Such configurations also provide manufacturing tolerance for the required spacing between the diffractive structures and the underlying imaging device.

A single plate 200 is too angle-sensitive for many imaging applications. That is, while a single plate may indeed adequately focus light over a range of angles, the range is too narrow to image scenes with large fields of view. Returning to FIGS. 1A and 1B, device 100 is equipped with many diffractive structures 120, each of which is scaled and oriented to focus incident light of a respective narrow cone of angles, and to provide suboptimal focusing for incident angles outside that cone. The central diffractive structure 120 is circular, but the remaining structures 120 are elliptical, with an eccentricity that increases toward the edges of grating 115. Both the eccentricity of an elliptical zone plate and its orientation in the plane of grating 115 determine the angle of incident light that will focus on sensor 105.

Figure 3A:
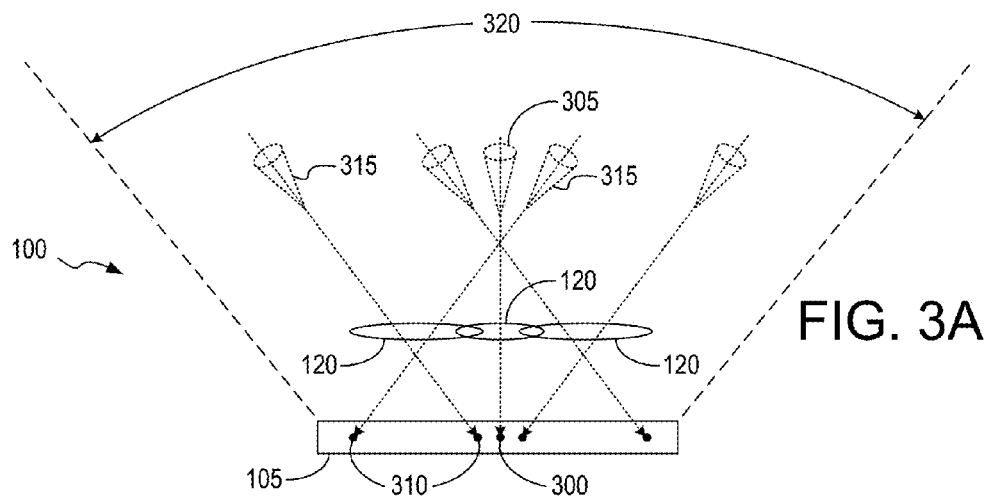
FIG. 3A is a simplified view of imaging device 100 of FIG. 1.

FIG. 3A is a simplified view of imaging device 100 of FIG. 1. Three diffractive structures 120 are shown as ellipses with different eccentricities. The differences are exaggerated for ease of illustration. The central diffractive structure 120 is a circle, and so exhibits a single "best" focus 300, designated by a dot, when illuminated over a range of angles illustrated by a cone 305. The other two plates 120 are elliptical, so each exhibits a pair of "best" foci 310, one for each of two ranges of angles illustrated by a pair of cones 315. Cones 305 and 315 cover different portions of a range 320 of incident angles that collectively represent a scene of interest. Cones 305 and 315 are insufficient to cover the field of view 320 in this example; however, the number, shapes, and orientations of zone plates can be selected to cover the entire field of view 320 and give a degree of angular resolution required to resolve the scene with a desired resolution. In other words, a patchwork of dissimilar structures can provide an overall focusable response over the angle of view corresponding to the scene.

Figure 3B:
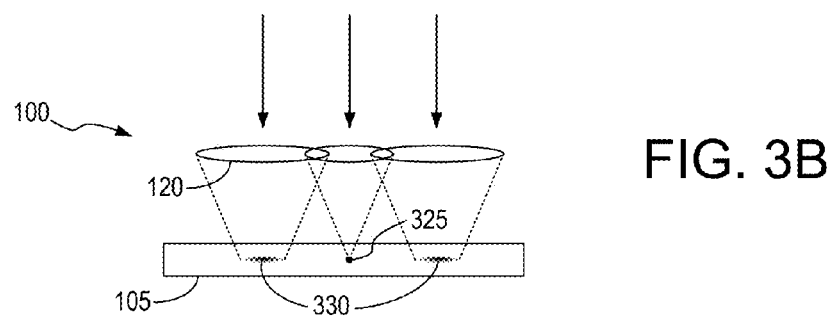
FIG. 3B shows imaging device 100 of FIG. 3A with incident light normal to the plane of diffractive structures 120.

FIG. 3B shows imaging device 100 of FIG. 3A with incident light normal to the plane of diffractive structures 120. Such light is within the angles of best focus of cone 305, but not within those of cones 315. The central diffractive structure 120 thus focuses the incoming light nearly to a point (forming a narrow point-spread function ("PSF")) 325, whereas the outermost diffractive structures 120 produce much wider PSFs 330 on sensor 105. The resultant diffraction pattern is indicative of incident light normal to the grating.

Figure 3C:
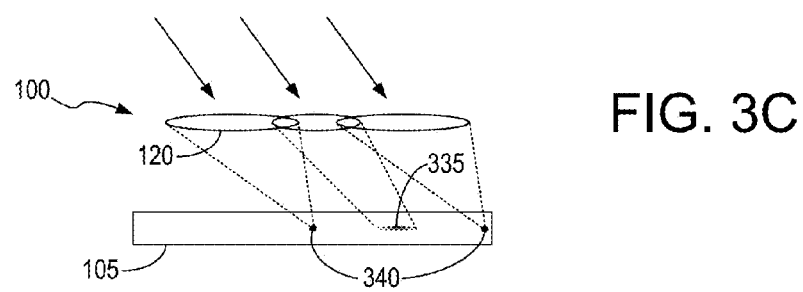
FIG. 3C shows imaging device 100 of FIGS. 3A and 3B with incident light arriving at an angle within one of cones 315 and outside of cone 305 (FIG. 3A).

FIG. 3C shows imaging device 100 of FIGS. 3A and 3B with incident light arriving at an angle within one of cones 315 and outside of cone 305 (FIG. 3A). The central diffractive structure 120 thus produces a blurred PSF 335 and each of the outermost diffractive structures 120 a more tightly focused PSF 340. The resultant diffraction pattern is clearly different from that of FIG. 3B, and indicates that light is arriving from a different angle of incidence.

The illustrations of FIG. 3A-3C show how light from different angles of incidence produces different interference patterns on sensor 105. An imaging device with overlapping diffractive structures, each focusing light from over a respective cone of incident angles, creates a complex interference pattern that represents the angle and intensity information required to represent a scene. Note, for instance, that the focused PSF for the leftmost structure 120 in FIG. 3C is detected at a similar sensor location as the focused PSF 325 for center structure 120 in FIG. 3B; the pattern of the other responses in each case, however, allows the actual direction of arrival to be determined. Sensor 105 captures this pattern, and an image resembling the scene can be computed from the sensor output.

Figure 4:
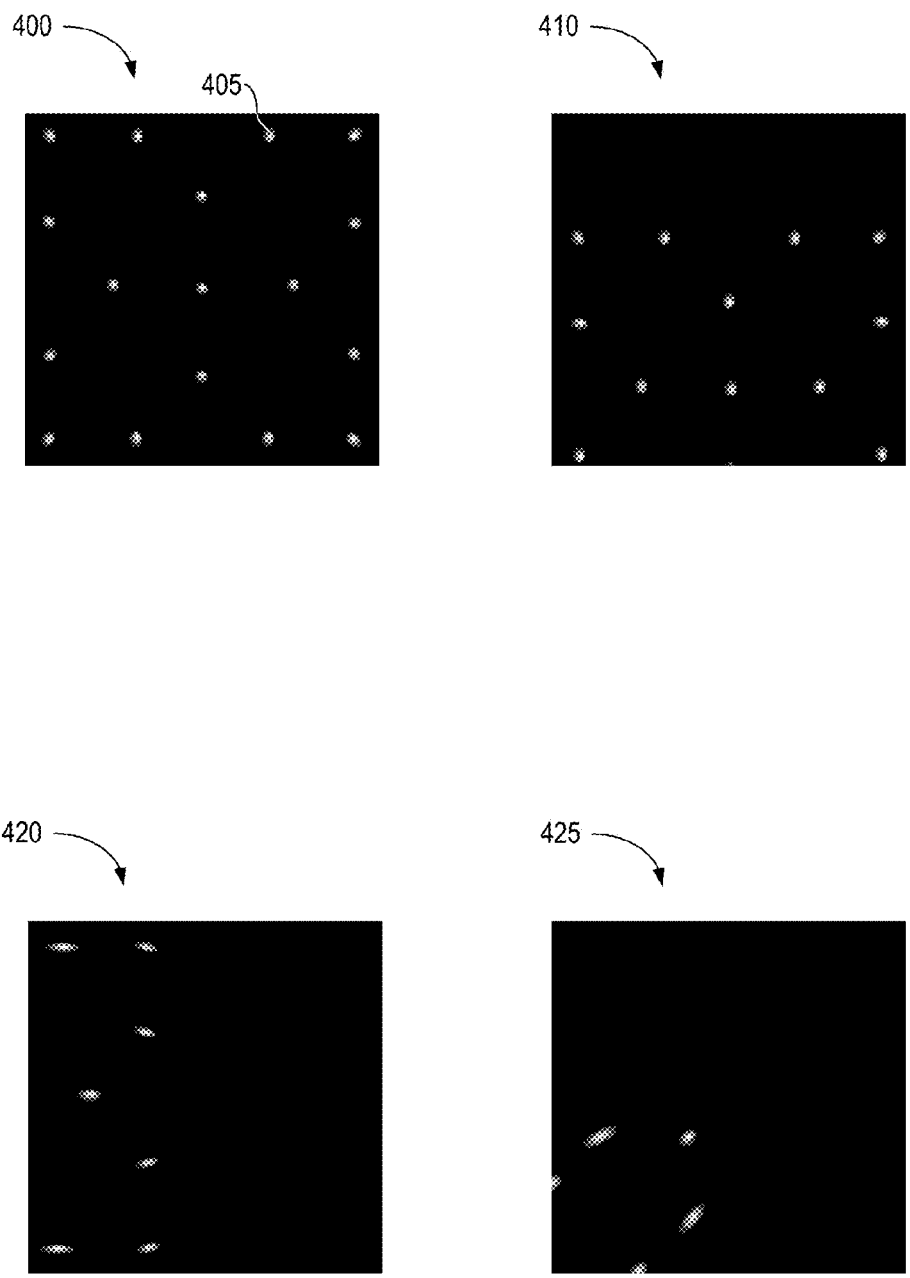
FIG. 4 depicts PSF patterns at the sensor array for grating 115 of FIG. 1B at four incident angles.

FIG. 4 depicts PSF patterns at the sensor array for grating 115 of FIG. 1B at four incident angles. The upper-left PSF 400 is the interference pattern due to a point source directly above—normal to the page—grating 115. Each of the seventeen diffractive structures 120 focuses the light to a corresponding PSF on the sensor plane to produce a constellation of seventeen focus points 405, each of which illuminates one or more pixel structures on the sensor array. The bounds of the dark area represent the capture area of sensor 105.

The upper-right PSF pattern 410 shows the interference pattern due to a point source that has shifted upwards in the y-direction from that of pattern 400. In this example the constellation of focus points moves down, with the lowermost points missing sensor 105. The remaining PSFs 420 and 425 show interference patterns due to point sources shifted to the right at a more extreme angle in the x-direction from that of pattern 400, and shifted more extremely upwards in the y-direction and to the right in the x-direction from that of pattern 400 near the limits of the angular range of the sensor, respectively. In dependence on the angle of incidence, a particular structure may produce a substantially sharp focused PSF at the sensor, a blurry focus PSF at the sensor, or may miss the sensor altogether. The sensor area can be larger than the grating area to capture all or a greater percentage of the available interference patterns in other embodiments.

Grating 115 can be thought of as performing a mathematical operation transforming incident angles from a scene to patterns of PSFs at given locations on image sensor 105. In the point-source examples of FIG. 4, images on the photodetector array bear little or no resemblance to the captured scene. Some applications may not require an image that is intelligible to a human observer. For example, machine-based pattern recognition or flow measurement can be accomplished without processing the sensed image data to recover an image of the scene. Where it is desirable to recover an image from sensor data, a processor and related memory (not shown) can be used to invert the mathematical operation performed by grating 115. The above-incorporated application Ser. No. 14/184,978, issued 18 Aug. 2015 as U.S. Pat. No. 9,110,240, details an example of how to derive an inverse for one type of grating. That derivation can be used to derive an inverse function for grating 115, as will be evident to those of skill in the art.

Three suitable techniques for deriving an inverse function for a given optical system include regularized pseudoinverse techniques, Fourier-domain methods, and compressed sensing. Regularized pseudoinverse techniques include Tikhonov regularization, which proceeds as follows.

The optical transformation performed by the ensemble of diffractive structures can be modeled as a general linear system A. Point sources from every angle of interest within the range 320 create a distinct PSF, which may have multiple points of light, some of them sharper than others. The system matrix A is the ensemble of all PSFs within 320. For complex scenes x, as long as the scene is illuminated with incoherent light, the sensor readings y will be the sum of all of the PSFs at various angles weighted by how much light came from those angles. In linear algebra, a formula for y given A and x is y=Ax. Since y is measured, A is known by calibration and the imaging task is to find x, we can solve this equation if A has an inverse. Then, $x=A^{-1}y$ will yield the original scene.

When A is not conditioned well and y has significant noise, a regularized pseudoinverse of A yields better practical results. One popular such pseudoinverse is given by Tikhonov regularization: $x=(A^T A+bI)^{-1}A^T y$. Here, I is the identity matrix and b is a regularization parameter, which essentially adds better noise robustness to the inversion process. For many diffractive devices including the structures here, the PSFs are locally spatially invariant. If the PSF (denoted by "k" in formulas from here on) were completely spatially invariant, then y=k#x, where "#" is the convolution operator. Then, a regularized Fourier-domain inversion formula is much faster to compute: $x=F^{-1}[K^*/(|K|^2+b)F[y]]$ where F is the 2D Fourier transform, K=F[k], and "*" is the complex conjugate operator. When the PSF is well-approximated as being spatially invariant over only a small range of incident angles, (perhaps only over incident angles within cones 305 or 315), Fourier domain methods can be used with a set of ks each valid for a certain range of angles, yielding reconstructions x valid only for this range of angles. Blending several such reconstructions by taking weighted averages reflecting the different areas of validity for each PSF can yield a reconstructed x which in practice can be very close to the reconstruction obtained by Tikhonov regularization, at a substantially reduced computational cost.

The third reconstruction technique, compressed sensing, can be used in conjunction with either Tikhonov or Fourier domain reconstruction techniques. Here, prior information about the scene's structure is fused with the measured data to yield an enhanced image. Some common prior assumptions about the image are that it can be described with a sparse set of wavelets from a known dictionary, that its total variation norm is small, or other assumptions known to those skilled in the art. Compressed sensing typically reduces the image formation problem to a convex optimization problem involving balancing penalties from departures on one hand between x and the expected structure of the world, and on the other hand between y and the signal that would be obtained given the current guess for x.

Returning to FIGS. 1A and 1B, in one embodiment each ellipse of a desired degree and orientation can be formed by the holographic interference pattern between the desired focal location on the sensor array and incident light at an angle other than the normal: the larger the angle of incidence (as measured from the normal line), the more eccentric the oval. Each diffractive structure 120 preferably uses a limited number of Fresnel zones—the consecutive lowest-order zones in this embodiment. Limiting the number of zones affords a degree of wavelength insensitivity, at a tradeoff to minimum PSF size for a given central wavelength. The zones and number of zones can be tailored to the imaging task of interest. Diffractive structures 120 overlap one another for area efficiency, which reduces the size and fabrication cost of device 100. Zone/phase plates need not overlap, or can overlap more or less, in other embodiments.

Boundaries between overlapping diffractive structures 120 appear jagged in this embodiment; this is intentional. The phase function of a given diffractive structure 120 will exhibit maxima and minima over a continuum. On areas of the diffractive structure relatively near the boundaries of where one feature would place a phase retardation, the quality of the focus created by that feature is relatively insensitive to the phase delay provided by the grating features. However, this area (whose shape is of little consequence to one feature's focus) may be an area of consequence to an overlapping, neighboring plate. Then, control of the features in this area can be ceded to the features whose focus is most affected, improving the overall device operation.

Figure 5:
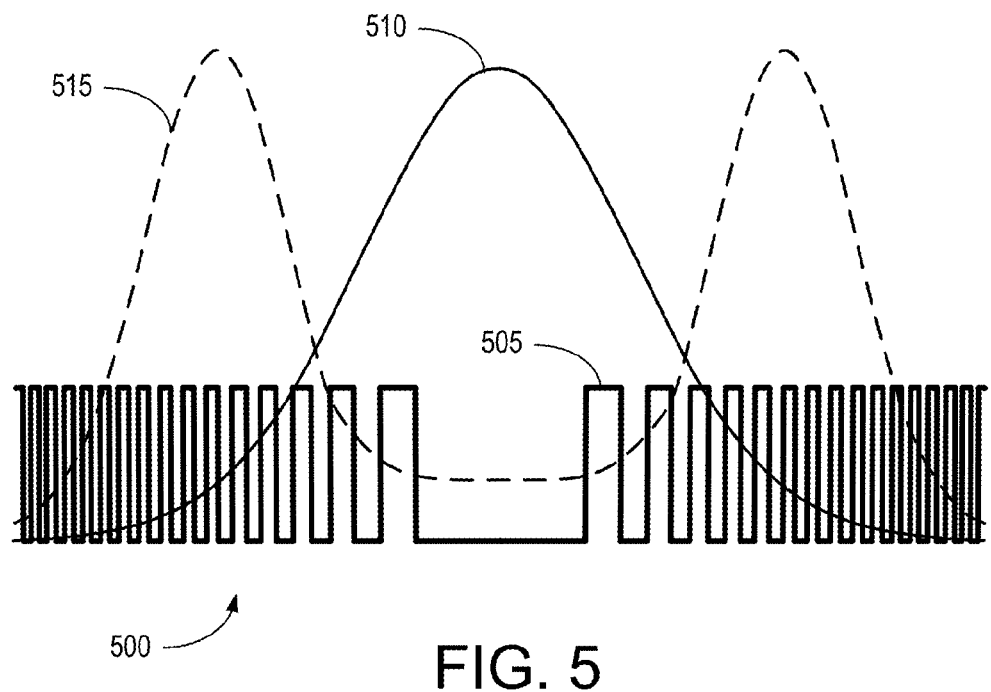
FIG. 5 depicts the first 16 orders of a full Fresnel phase plate 500 in cross section, with concentric phase reversals 505.

FIG. 5 depicts the first 16 orders of a full Fresnel phase plate 500 in cross section, with concentric phase reversals 505. A low-order weighting function 510 governs the relative proportions of different phase gratings that should be present at a given position. A mid-order weighting function 515 is also overlaid in FIG. 5. One may visualize the weighting function rotationally applied to all cross-sections of each full Fresnel phase plate, prior to its instantiation on grating 115.

Once one has fixed the center location, eccentricity, and orientation of the major axis of each candidate diffractive structure for grating 115, a procedure using the location and weighting information of FIG. 5 is used to determine, for all candidate diffractive structures that overlap at each point on grating 115, which phase should be selected for that point. One way to accomplish this weighting which cedes control of areas in a way that optimizes the overall device function is as follows. Initially, the desired phase of the entire array is set to a complex value; say 0+0.1 i. Next, the following procedure is executed for every candidate diffractive structure 120.

A location on grating 115 and a corresponding point of desired focus on the array of photosensors 110 are chosen. The greater the lateral disparity between these two points, the more eccentric the resulting ellipses in the diffraction pattern, and the greater the angle of incidence of the ray this device will optimally focus. Next, a unit-magnitude, complex phase delay, needed to be introduced at the phase grating to make the incident beam focus at the array point, is computed for every point on the grating. Next, a weighting function indicating which orders to be preserved scales this complex phase delay—this could be a Gaussian hill (e.g., function 510) centered on the center of the pattern to make the embodiment of FIG. 1A or a function peaked at higher-order zones (e.g. function 515) to make the embodiment of FIG. 7.

Next, a dot product is taken between the existing phase of the entire array and this scaled, complex phase delay of the feature to be added. The complex phase of this dot product reveals the complex phase which, when multiplied by the scaled, complex phase delay of the new feature, results in the addition to the entire array that results in the smallest disturbance of the existing pattern. Once all features have contributed to the desired complex phase of the device, all regions of the device with a positive real part are said to be of one phase grating state, and others are said to be of the other state. (If more than two levels of phase retardation are available, retardation can be made to approximate the phase of the complex desired retardation.) In other embodiments, the final output can be an amplitude grating rather than a phase grating, with the black areas of the grating blocking light transmission and the white areas allowing light transmission.

Figure 6A:
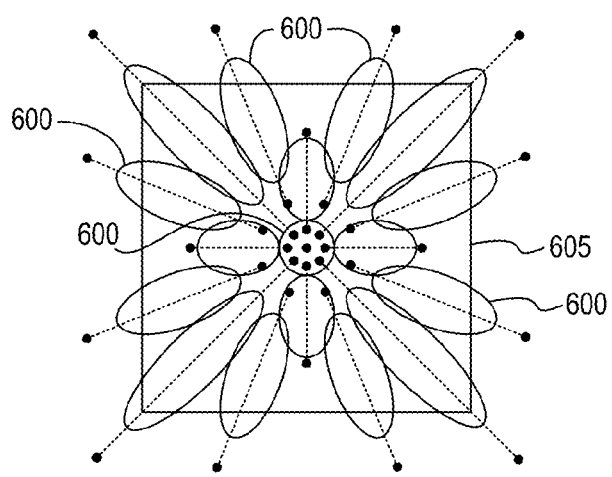
FIG. 6A graphically depicts a diverse collection of features 600 as ellipses with different eccentricities and orientations in a plane parallel to the sensor array of an underlying sensing area 605.

FIG. 6A graphically depicts a diverse collection of features 600 as ellipses with different eccentricities and orientations in a plane parallel to the sensor array of an underlying sensing area 605. The central feature 600 exhibits a single "best" focus on the underlying array, designated by a dot. The remaining features 600 are elliptical, so each exhibits a pair of "best" foci. For clarity, each foci pair is joined by a dashed line that bisects the corresponding plate 600.

The locations of zone plates 600 and their corresponding foci are mirrored horizontally and vertically about the center of the grating in this example. Most of the sharp point-spread-function (PSF) features—the foci—thus occur towards the center of area 605. An image sensor based on this collection of plates 600 could not make best use of tight pixel spacing around the edges of sensor area 605, and sharp features near the middle of area 605 could have originated from any of several directions. Note, for example, the multitude of foci near the center of area 605 and the relative paucity of foci near the boundaries.

Figure 6B:
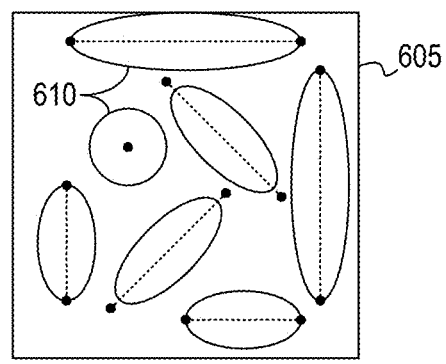
FIG. 6B graphically depicts a diverse collection of features 610 that, as compared with plates 600 of FIG. 6A, produces a more evenly distributed constellation of foci on an underlying sensor area 605.

FIG. 6B graphically depicts a diverse, asymmetric collection of features 610 that are irregularly spaced and oriented. As compared with plates 600 of FIG. 6A, features 610 produce a more evenly distributed constellation of foci on an underlying sensor area 605. Alternatively, if the grating material is inexpensive, one can exploit variations in opacity, and the grating can be made larger than the sensor, radially arranged devices spaced sufficiently far from each other could also give sufficient separation between adjacent foci. As per this illustration, the layout of the plates need not have any discernible relationship to the layout of the angular "best" performance for each plate, leaving the designer free to optimize separation between foci, number of effective zones of each partial Fresnel grating utilized, etc. Also, whereas a mirrored arrangement of plates as in FIG. 6A provides duplicate coverage for some angles due to its symmetry, FIG. 6B allows just one plate for each set of angles of best focus.

Figure 7:
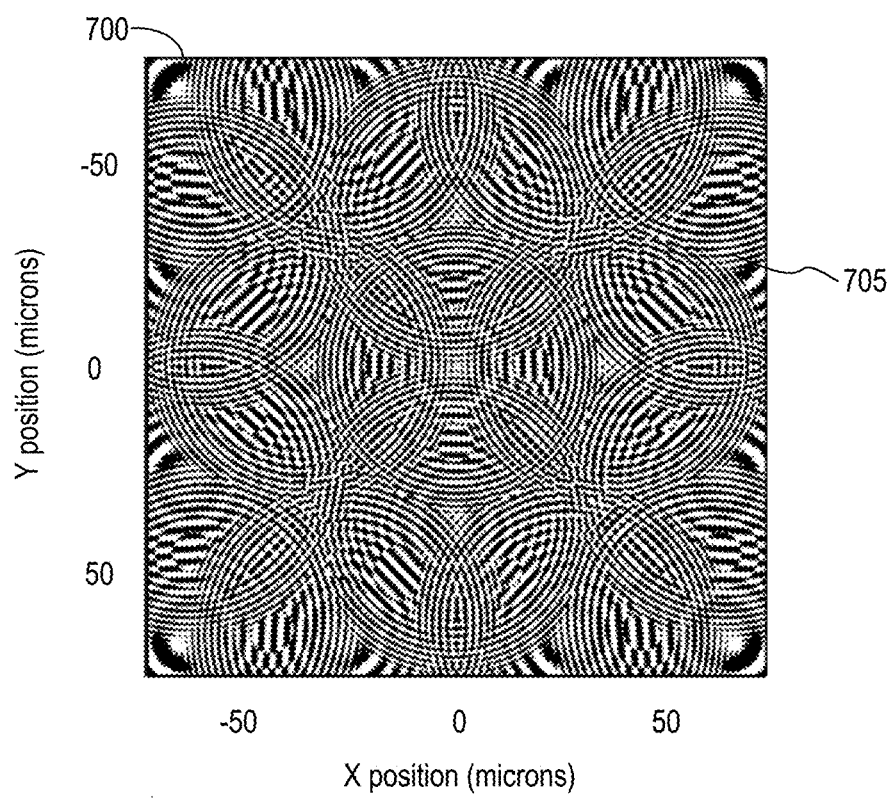
FIG. 7 depicts a grating 700 in accordance with another embodiment. Grating 700 includes adjacent and dissimilar diffractive structures 705.

FIG. 7 depicts a grating 700 in accordance with another embodiment. Grating 700 includes adjacent and dissimilar diffractive structures 705. As in grating 115 of FIGS. 1A and 1B, each diffractive structure 705 is a phase plate, which appears as a series of concentric grating features. Whereas grating 115 is weighted to favor the lowest orders of Fresnel phase plates where two structures overlap, grating 700 is weighted to favor adjacent higher-order, intermediate zones for each structure 705 (e.g., weighting function 515 of FIG. 5 is used for the overlapped calculations). The lower-order zones are omitted or deemphasized, and the diffraction elements, or features, in the center of structures 705 can belong to adjacent phase plates.

Both gratings 115 and 700 employ the same or a similarly limited number of highly weighted consecutive zones, but grating 700 can focus light to a tighter spot, enabling higher-resolution imaging, while retaining an acceptable degree of wavelength insensitivity. The 12-16th order Fresnel zones optimized for green light may align to a large degree with the 14-18th order blue-light zones, so designing a $12\text{-}16^{th}$ order green-light version of grating 700 will produce a device still relatively similar to a device designed as a $14\text{-}18^{th}$ order blue-light device. A $0\text{-}16^{th}$ order green-light device, however, would not align with any $0\text{-}18^{th}$ blue light phase plate. The effective apertures of diffractive structures 120 are also smaller than those of diffractive structures 705, meaning that due to diffraction limits, the focus possible with the embodiment of FIGS. 1A and 1B may be blurrier than the focus possible with the embodiment of FIG. 7 for similar size gratings with similar angular coverage. Missing the central zones, each zone plate 705 produces a weighting function similar to function 515 of FIG. 5.

Figure 8:
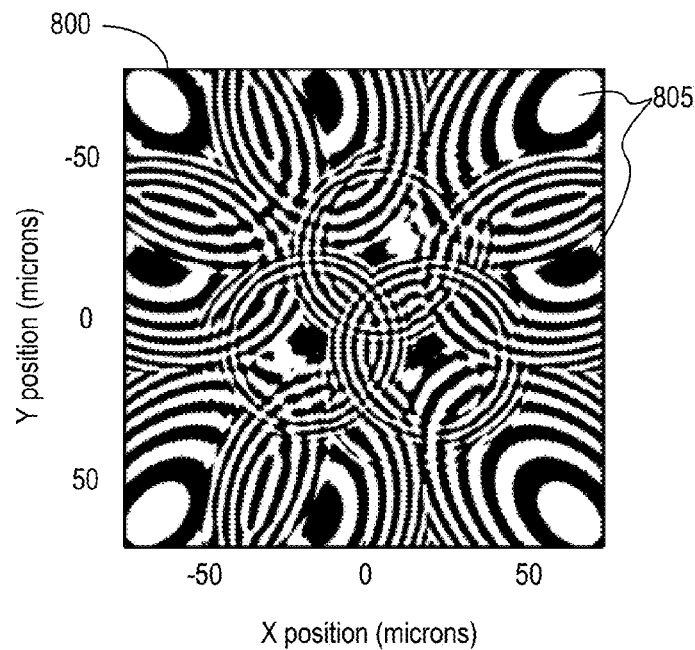
FIG. 8 depicts a grating 800 with a patchwork of zone plates 805.

FIG. 8 depicts a grating 800 with a patchwork of zone plates 805. The outermost zone plates 805 exhibit exaggerated eccentricities that can focus extremely eccentric incident light. Grating 800 was generated with a weighting function that more heavily weights the mid-order rings; nevertheless, toward the edges some low-order rings are present as no neighboring mid-order rings competed for that space on the grating. Grating 800 otherwise functions in a manner similar to grating 115 of FIGS. 1A and 1B, so a detailed discussion is omitted.

Figure 9:
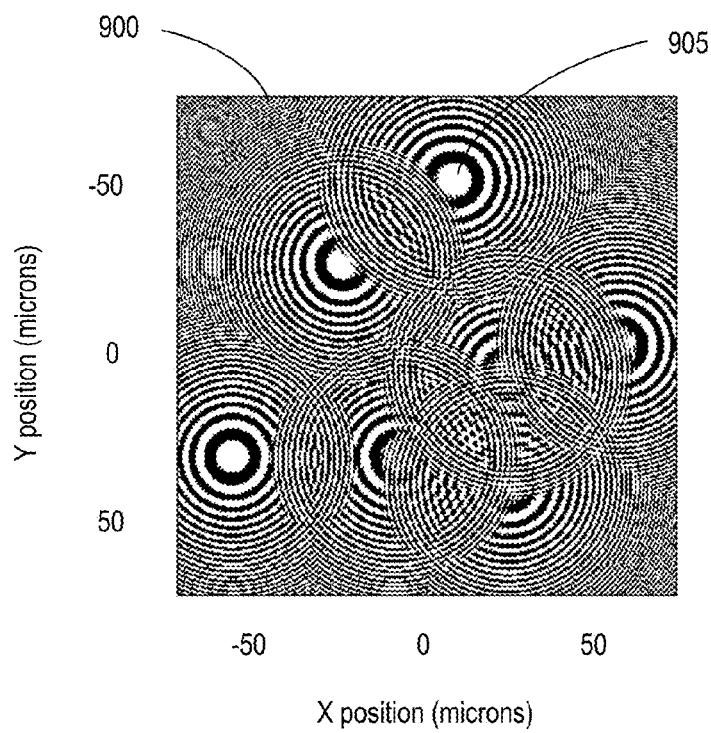
FIG. 9 depicts a grating 900 with a patchwork of features in accordance with the high-level placement scheme shown in FIG. 6B.

FIG. 9 depicts a grating 900 with a patchwork of features in accordance with the high-level placement scheme shown in FIG. 6B. Here, the range of incident angles of interest is small, making the features similar to each other, as in grating 700 of FIG. 7. Grating 900 otherwise functions in a manner similar to grating 115 of FIGS. 1A and 1B, so a detailed discussion is omitted.

Figure 10:
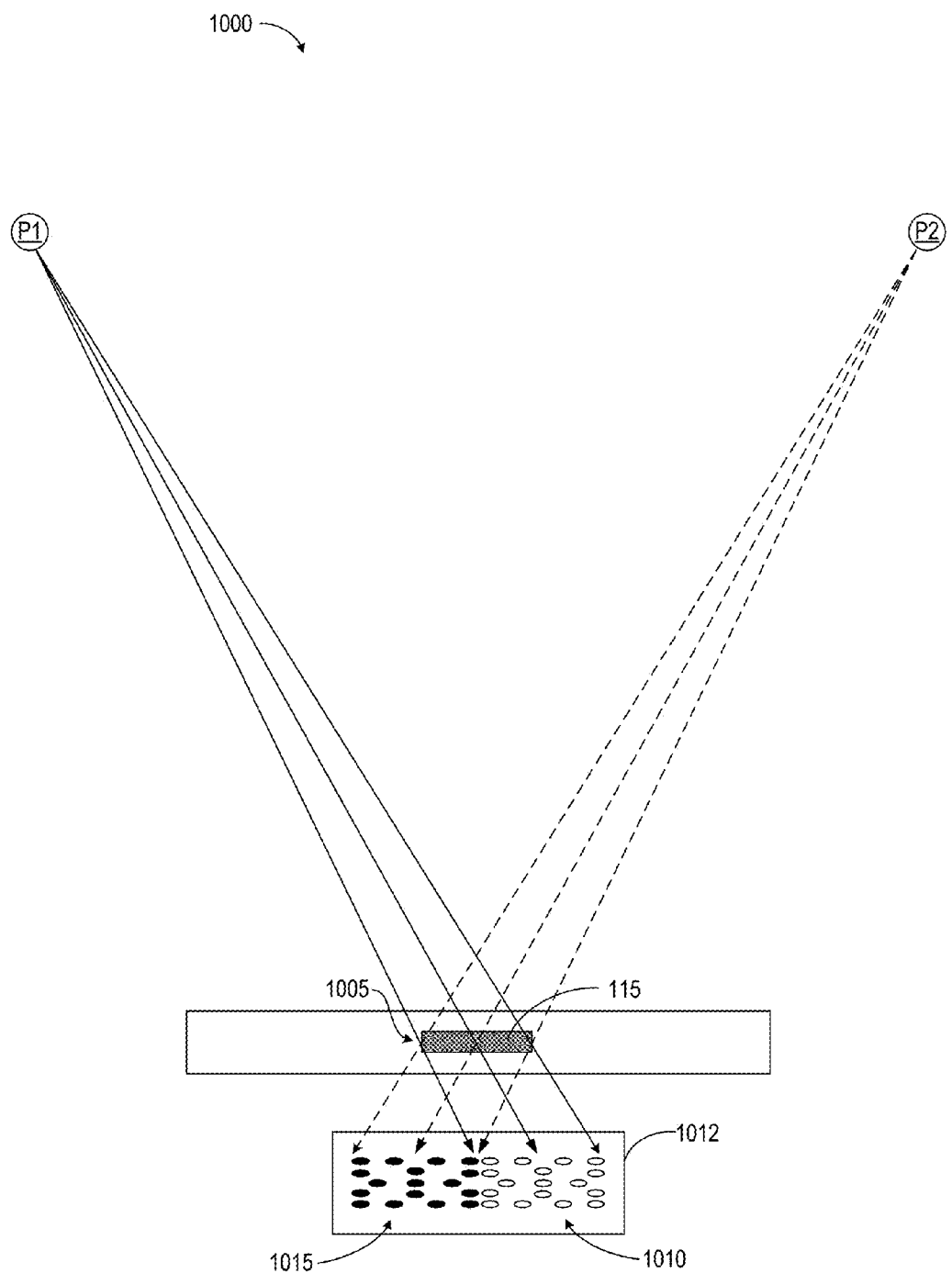
FIG. 10 depicts an imaging system 1000 in which grating 115 of FIGS. 1A and 1B is used in conjunction with an aperture 1005 for improved angle sensitivity and spurious light rejection.

FIG. 10 depicts an imaging system 1000 in which grating 115 of FIGS. 1A and 1B is used in conjunction with an aperture 1005 for improved angle sensitivity and spurious light rejection. Light from a point source P1 on the left produces an interference pattern 1010 at the right on a sensor surface 1012, whereas light from a point source P2 on the right produces an interference pattern 1015 at the left. Aperture 1005 blocks rays from sources P1 and P2 outside of the aperture area that would interfere with patterns 1010 and 1015, resulting in improved angle sensitivity. The increased angle sensitivity can be used to advantage in e.g. motion detection and measurement. Aperture 1005 can be fixed or variable, as can the spacing between grating 115 and surface 1012. Adjusting the spacing between grating 115 and sensor surface 1012 can bring different wavelengths into better or worse focus at different spacings. In some embodiments sensor surface 1012 can be moved laterally with respect to grating 115, which allows the use of a relatively small sensor to successively image portions of a scene to capture the entire scene, albeit at a reduced frame rate.

Figure 11:
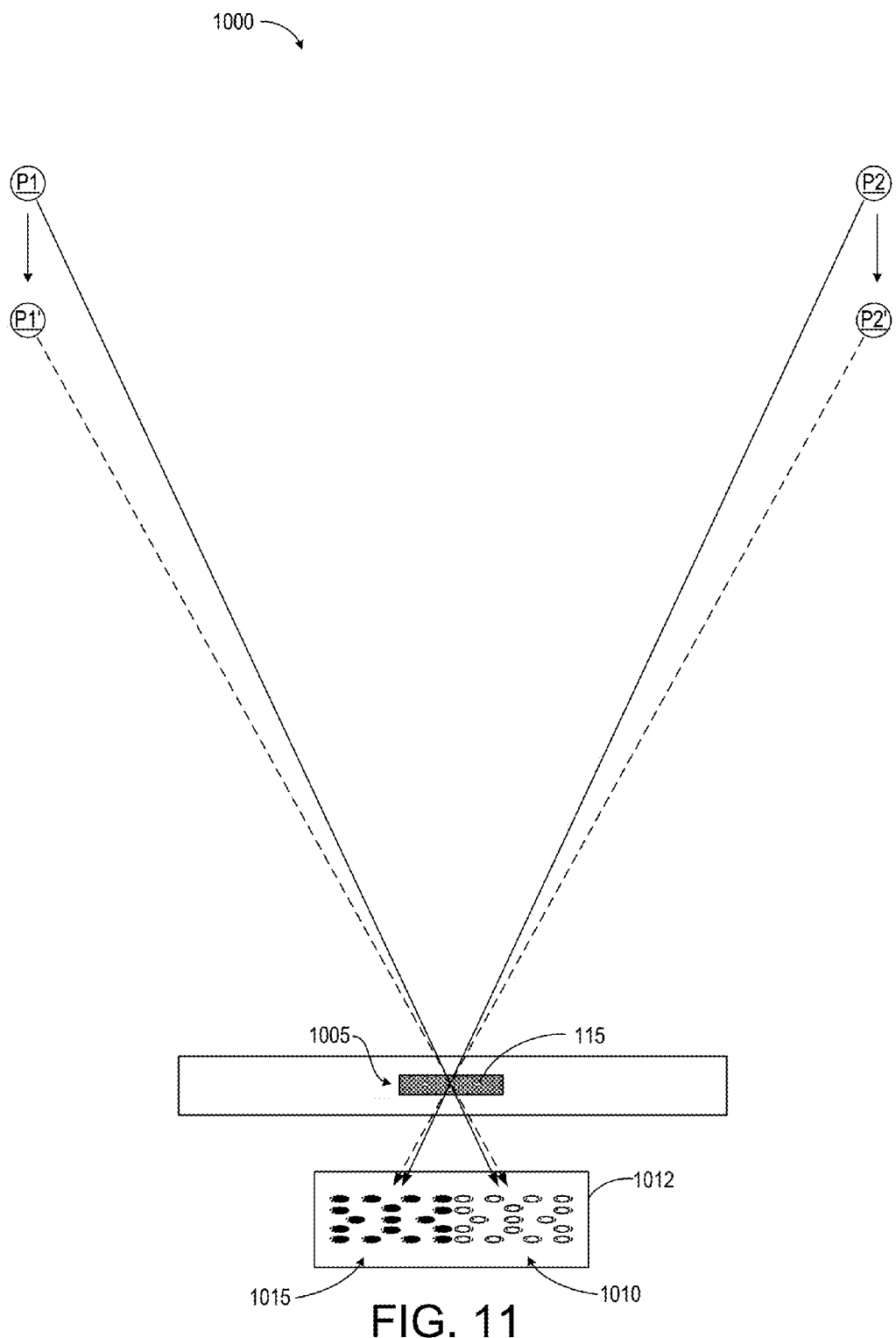
FIG. 11 depicts imaging system 1000 of FIG. 10 in a manner that illustrates how angle sensitivity can be used to sense looming (motion toward and away from the system).

FIG. 11 depicts imaging system 1000 of FIG. 10 in a manner that illustrates how angle sensitivity can be used to sense looming (motion toward and away from the system). As point sources P1 and P2 move closer to grating 115, or vice versa, the separation between interference patterns 1010 and 1015 increases. The change in separation can be sensed or measured to sense or measure motion toward and away from grating 115.

Generally, panning and/or x/y translation can be discovered using a two-dimensional cross-correlation of the entire imaged sensor area. For looming, however, one technique is to consider the sensor area separately for left/right, top/bottom, or quadrants, and then perform cross-correlation on each area with itself in the second frame. For simple left/right estimation, the average of the left and right correlation estimates can be considered as an estimate of left/right translation, and the difference between the left and right correlation estimates can be considered as an estimate of the extent to which scene elements are moving towards or away from, or remaining at roughly the same distance from, the imager.

Figure 12:
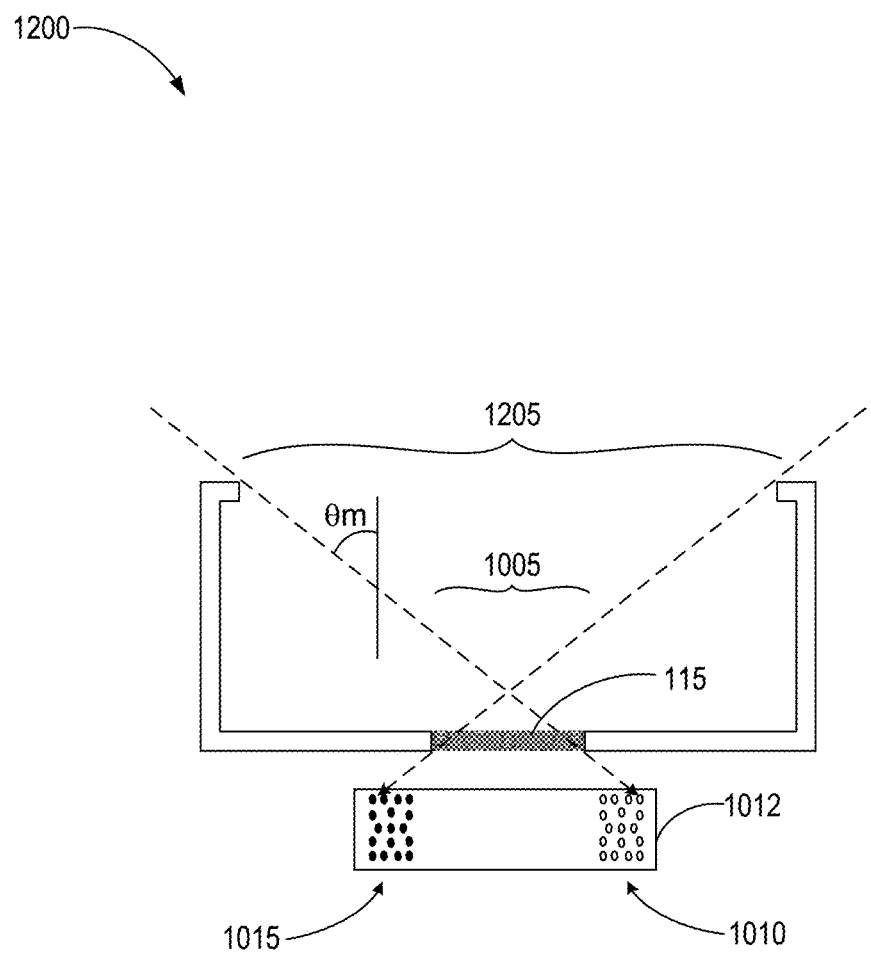

FIG. 12 depicts an imaging system 1200 similar to imaging system 1000 of FIGS. 10 and 11, with like-identified elements being the same or similar. System 1200 includes a second aperture 1205 spaced farther from the sensor than the first aperture 1005. As illustrated with PSFs 410, 420, and 425 of FIG. 4, incident light of a sufficient angle relative to normal produces interference patterns that only partially overlap the underlying sensor. Aperture 1205 limits the field of view to a maximum angle of incidence θm, and thus reduces or eliminates more extreme sensed partial patterns. Either or both apertures 1005 and 1205 can be fixed or adjustable. The spacing between each aperture and sensor surface 1012 can also be fixed or adjustable. The shape of the aperture(s) can be selected to optimize e.g. imaging performance. Traditional shapes such as a square or circular aperture and a square or circular active diffraction region are more likely, but arbitrary shapes might also be used for specific applications. Lensless imaging systems and devices of the type disclosed herein can be used for infrared imaging, examples of which include thermography, thermal imaging, and thermal video. Typical thermographic imagers require expensive lenses made of exotic materials that refract but do not absorb mid- to far-infrared (IR) light of the wavelengths emitted by objects close to room temperature (e.g., about 10 microns). The cost of IR focusing optics currently hinders affordable thermography. Lensless image sensors have no need for expensive focusing optics, and can therefore drastically reduce the cost of thermography. Although a grating 115, similar to FIG. 1B is shown in aperture 1005, the arrangement of FIG. 12 is appropriate for grating structures of any of the types disclosed herein.

The focusing optics used for thermography can be replaced with a thin film of material that is refractive to IR light. It can be difficult to make an IR lens using inexpensive IR-refracting materials because they do not have mid-IR penetration depths over about 1 mm. Gratings of the type detailed herein can be much thinner—less than one millimeter—so inexpensive IR refracting materials, such as high-density polyethylene, can be used to capture IR scenes. The cost savings associated with lensless optics is not limited to thermography. More generally, lensless optics will be a small fraction of the total system cost for every wavelength band of interest (visible, mid-IR, X-rays, etc.).

Lensless imaging systems of the type detailed herein are relatively wavelength-robust; however, there can be tradeoffs between design parameters and the most suitable wavelengths for a given imaging system. For example, an IR camera operating in a colder environment would benefit from taller diffraction-grating depths and thicker rings elements. Other scene aspects that could benefit from dimensional changes in the grating include, without limitation: various electromagnetic spectrum bands of interest, distant or close objects (the former benefitting from comparatively wider grating features), low-light or wideband operation (where lower-order zones work better than higher-order zones).

Figure 13A:
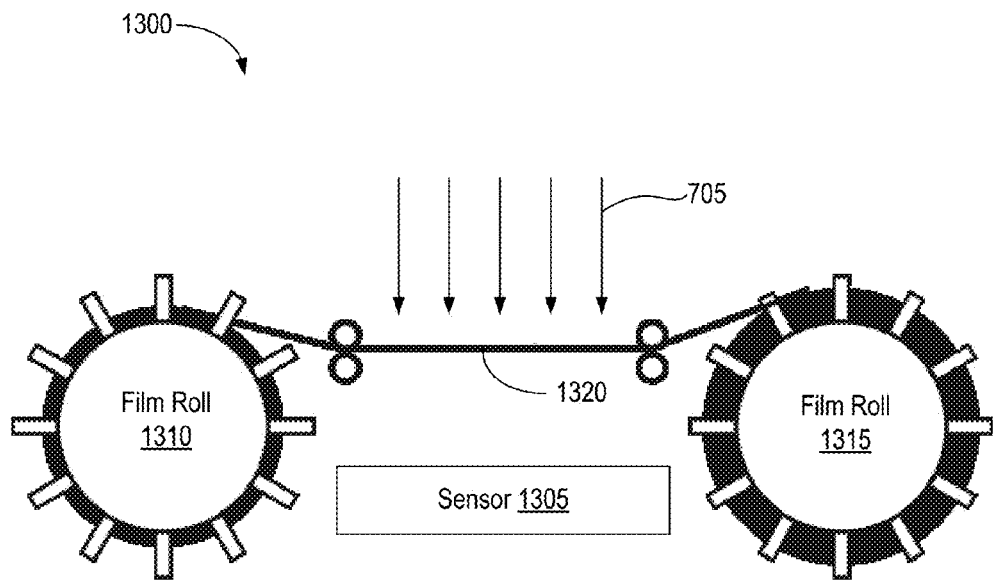
FIG. 13A depicts an imaging system 1300 with an actuator to move grating features laterally over a sensor 1305.
Figure 13B:
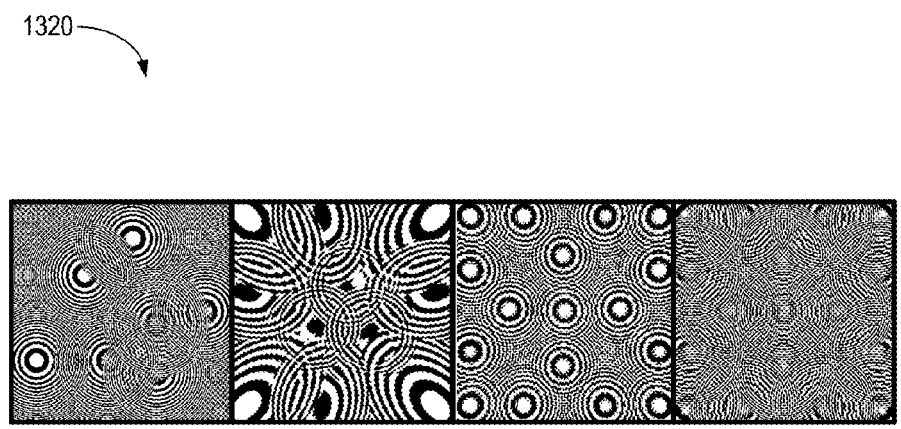
FIG. 13B is a plan view of a portion of film 1320 showing a small sample of exemplary diffraction patterns.

FIG. 13A depicts an imaging system 1300 with an actuator to move grating features laterally over a sensor 1305. In this example, the actuator includes a pair of rolls 1310 and 1315 that store a flexible film 1320 of diverse grating optics. FIG. 13B is a plan view of a portion of film 1320 showing a small sample of exemplary diffraction patterns. The grating optics may be shifted as celluloid film is shifted in a more traditional camera. For thermographic applications, certain frames of this roll adapted for cooler temperatures could have deeper steps in the cross section of the diffraction patterns, thicker anti-reflection layers, and wider diffraction pattern elements as compared to those optimal for a hotter temperature. Gratings adapted for much closer scenes would have diffraction grating features not as wide as those optimal for scenes at infinity, but might be otherwise similar.

In low-light (low-SNR) environments, it may be useful for the same grating pattern to be repeated (or, equivalently, a different pattern that measures the same aspects of the scene) while in higher-SNR environments it could be beneficial for the grating to encode more different observations with less redundancy. For applications where only certain spatial frequencies are of interest (e.g., for a bar code scanner where only one orientation is of interest) a special-purpose grating could be selected.

Objects that are relatively close to the grating surface will emit wavefronts which are significantly curved when observed at the plane of the grating. This curvature means that the width of diffraction features should decrease to maintain the optimality of the separation between diffraction grating and sensor.

Another application for interchanging gratings is as a one-time cryptographic pad. If each frame of the grating is composed of a unique diffractive element and if the frames' geometries are kept secret, then knowledge of the diffractive structure is needed to reconstruct the image so long as the active frame is shifted often enough to prevent an eavesdropper to blindly calibrate the sensor or to control the scene input.

If one of several different diffractive gratings can be selected, and each one is optimized for a different sensor-diffractive element spacing, imaging system 1300 could function as a zoom lens. Gratings farther from the sensor yield images with better angular resolution but with a narrower field of view. Additionally, the grating-sensor spacing can be monitored and adjusted based on the optical signals received. For example, the diffraction patterns from shorter-wavelength light attain their maximum utility at a greater grating-sensor spacing than for longer-wavelength light, and a feedback mechanism controlling the grating-sensor separation can maintain the separation that yields optimal results for a particular scene.

Another reason for varying the grating-sensor separation is that the object of interest in the scene approaches system 1300, in which case it is advantageous to increase the grating-sensor distance somewhat to maintain optimal high spatial frequency content—somewhat akin to how changing the lens position can accommodate different object depths in a scene in a focusing camera.

If the grating is substantially larger in area than the sensor array, the peripheral regions of the grating will not influence sensor readings when the grating is quite close to the sensor array, since only light at glancing angles passes through peripheral regions onto the sensor area. However, if the grating is moved farther from the sensor, these peripheral areas become optically relevant. Therefore, an arrangement with wider features in the periphery than the center could operate with the grating relatively near to or far from the sensor; in either case, a greater proportion of spacing-appropriate diffractive features are optically relevant than if the grating features had a uniform characteristic thickness.

If the scene is expected to contain objects at multiple depths (or multiple colors), it would be possible to optimize the width (and thickness) of gratings in different areas to perform best for selected subsets of these features. Other variations of imaging system 1300 include using a different design wavelength for different diffractive devices, covering some incident angle ranges more completely than others (e.g. if one desires an effective fovea, or region of higher fidelity).

Laterally Shifting Gratings

Shifting the grating laterally relative to the sensor can accomplish several desirable outcomes. For example, shifting the gratings by non-integral multiples of the pixel pitch can subsample the diffraction pattern generated by the grating at more points. This may be especially important if regions between pixel centers are not light receptive and diffraction patterns are finer than the pixel pitch, in which case some diffractive features may be unobserved by a laterally stationary sensor. Another important application of laterally shifting optics is relevant when the sensor is much more expensive than the grating. Then, a large grating can be translated (or, equivalently for distant scenes, the sensor can be translated) multiple times by an amount almost as large as the sensor, and data can be taken for each translation. Then, a single small sensor can sample the diffraction pattern generated by a much larger diffractive element, saving system cost. Another use is to capture a number of (static) images with sub-pixel shifts, the resulting images then combined to make a single higher-resolution image, a process known as super-resolution.

Exploiting Natural Motion of Substrate

Several applications lend themselves to exploiting the natural motion of the objects to which they are attached. For example, a linear imaging system that observes information only in one orientation could be mounted on a clock's second hand; every 30 seconds, it sweeps through all orientations, and the resulting observations are Fourier-complete and thus invertible. Similarly, single-orientation image sensor could be mounted on spinning wheels, rifle bullets, etc. and exploit the natural motion of their mounting to observe relevant information that would not have been available were the mount stable.

Intrinsically Changing Gratings

The ideas presented so far all prescribe explicit motion, yet there are other methods to achieve equivalent effects. Especially, if it were possible to control the grating features themselves to adapt on-the-fly to imaging conditions, For example, MEMS devices, sonic waves, or sufficiently high-resolution LCD arrays could directly change the optical properties of the gratings without the need to physically swap out the gratings.

Phase Anti-Symmetric Gratings

The diffractive structures detailed above focus light into constellations of points, and the resultant patterns are used to derive aspects of a scene. The patent applications incorporated in the foregoing "cross-reference" section describe various optical structures that focus light into diffraction patterns of straight and/or curved lines. These patterns too can be used to derive aspects of a scene. The following discussion illustrates an embodiment of a phase anti-symmetric grating that produces patterns of lines. The incorporated applications provide additional details regarding this and other examples.

Figure 14A:
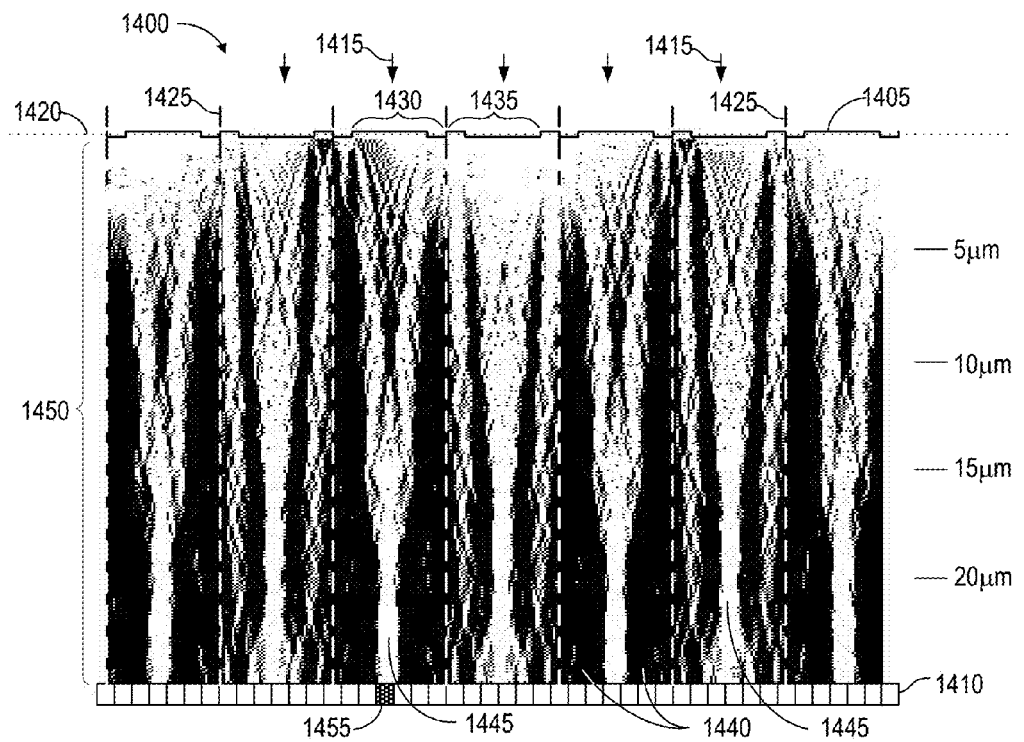
FIG. 14A is a cut-away view of an imaging device 1400 with a phase anti-symmetric grating 1405 overlying a photodetector array 1410.

FIG. 14A is a cut-away view of an imaging device 1400 with a phase anti-symmetric grating 1405 overlying a photodetector array 1410, such as a CCD (charge-coupled device), CMOS (complementary metal-oxide-semiconductor) or (in the case of midwave IR detection) a microbolometer sensor. The photodetector array may comprise a lenslet array designed to concentrate incident photons onto the most sensitive areas of the array to increase quantum efficiency.

The features of grating 1405 offer considerable insensitivity to the wavelength of incident light in a wavelength band of interest, and also to the manufactured distance between grating 1405 and photodetector array 1410. Grating 1405 produces an interference pattern for capture by array 1410. Digital photographs and other image information can then be extracted from the pattern.

Light in a wavelength band of interest is striking grating 1405 from a direction 1415 that is normal to a transverse plane 1420 of the grating 1405. Unless otherwise stated, the wavelength band of interest is the visible spectrum. Cameras developed for use in different applications can have different bands of interest, as is well understood by those of skill in the art.

Dashed lines 1425 highlight periodic boundaries between regions of phase anti-symmetry. Each of these boundaries is a result of features 1430 and 1435 of odd symmetry, and produces a normally arranged curtain 1440 of minimum intensity created by destructive phase interference between adjacent features 1430 and 1435. Curtains 1440 are separated by foci 1445 (curtains of maximum light intensity), and the collection of curtains 1440 and foci 1445 extend from grating 1405 through the body 1450 of device 1400 to produce an interference pattern on photodetector array 1410. In this illustration, the pattern of intensity variations evident in the foci and curtains are near-field spatial modulations that result from near-field diffraction. One photosensitive element 1455 within array 1410 is shaded beneath a focus 1445 to serve as a reference for a subsequent discussion of the sensitivity of device 1400 to the angle of incident light.

The image of FIG. 14A resulted from a simulation of an imaging device with the following parameters and assuming specific parameters. Body 1450 is of fused silica, and is in contact with a conventional photodetector array 1410 with photosensitive elements spaced by 2.2 μm. The top of grating 1405 is an air interface in this example. The relatively small segments of features 1430 and 1435 are about 14 μm, and the relatively larger segments are about 4 μm. These segments generally form transverse plane 1420, which is separated from array 1410 by about 25 μm. Curtains 1440 and foci 1445 are the destructive and constructive interference patterns for 532 nm incident light.

The thickness of body 1450 and lengths of the segments of features 1430 and 1435 were optimized for 400 nm light despite the selection of 532 nm light for the simulation. As a consequence, the tightest focus occurs about Sum above array 1410 (at the 20 μm mark). The resultant curtains 1440 plainly separate foci 1445 well above and below the 20 μm mark, however, illustrating a robust insensitivity to wavelength within the band of interest. The relatively deep and continuous penetration of curtains 1440 also provides considerable manufacturing tolerance for the thickness of body 1450. These advantages obtain because the near-field spatial modulations projected onto array 1410 are wavelength independent over the wavelength band of interest, which means that the adjacent modulations (dark and light) do not reverse signs with changes in wavelength within the band of interest.

Figure 14B:
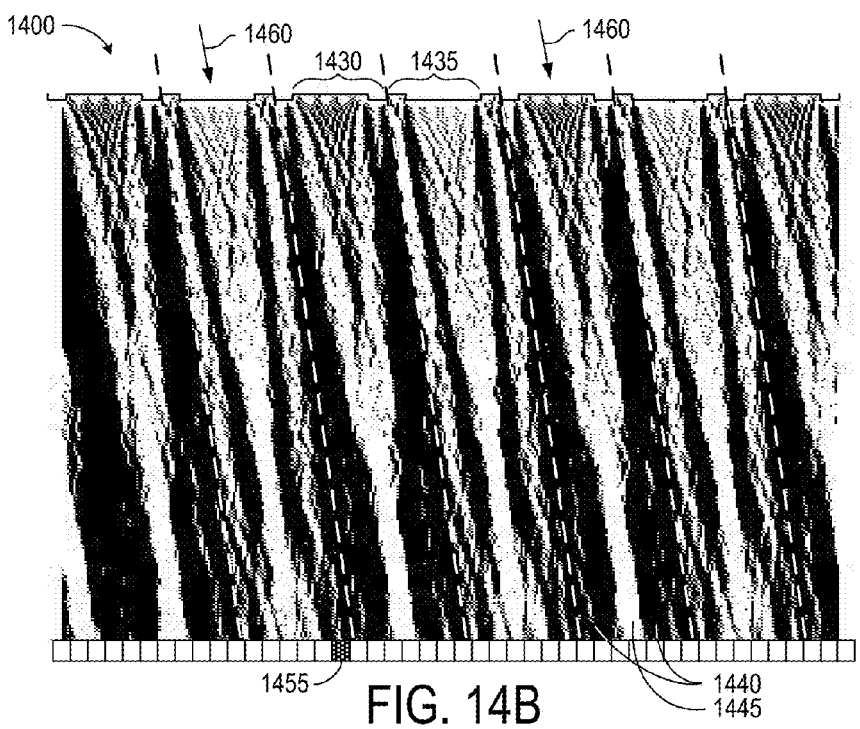
FIG. 14B depicts sensor 1400 of FIG. 14A simulating light incident plane 1420 at an acute angle 1460 to illustrate the sensitivity of curtains 1440 and foci 1445 to the angle of incidence.

FIG. 14B depicts sensor 1400 of FIG. 14A simulating light incident plane 1420 at an acute angle 1460 to illustrate the sensitivity of curtains 1440 and foci 1445 to the angle of incidence. Using element 1455 as a reference point, we see that that the foci 1445 that illuminated element 1455 in FIG. 14A have considerably moved to the right in FIG. 14B. Curtains 1440 and foci 1445 extend at an acute angle that relates to angle 1460 according to Snell's law. The separation of foci 1445 by curtains 1440 is maintained. Sensor 1400 is thus sensitive to the angle of incidence.

Each phase anti-symmetric structure generates a diffraction pattern, and the resultant collection of patterns is itself a pattern. For a point source, this pattern of light intensity on the sensor is called a "point-spread function" (PSF). As used herein, a "diffraction-pattern generator" is a structure that produces PSFs for light within the wavelength band of interest, and for a range of orientations of interest. In this one-dimensional example, the orientation of interest is perpendicular to the boundaries of odd symmetry.

Figure 15A:
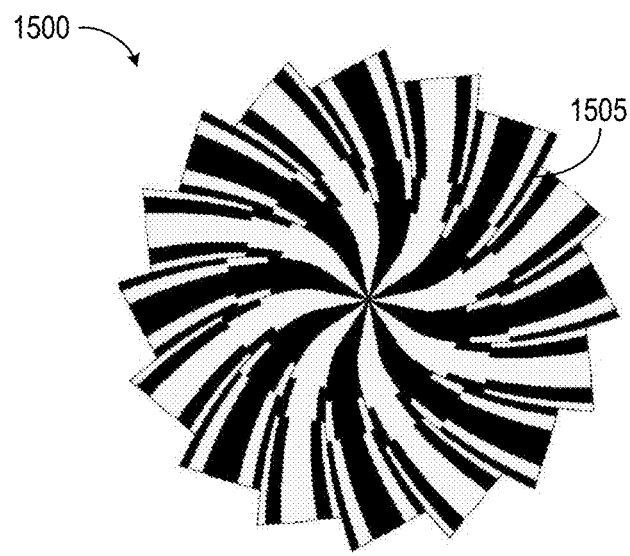
FIG. 15A is a plan view of a grating 1500 in accordance with another embodiment.
Figure 15B:
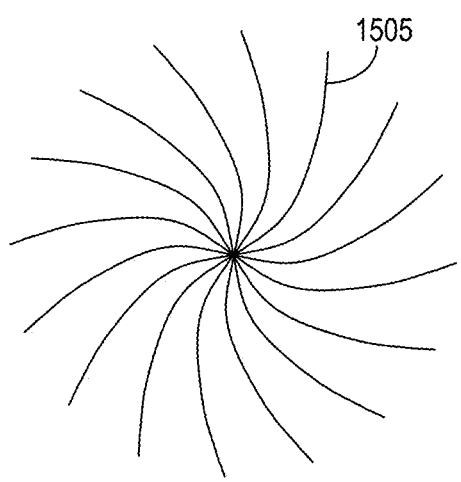
FIG. 15B depicts the shapes of boundaries 1505 of FIG. 15A.

FIG. 15A is a plan view of a grating 1500 in accordance with another embodiment. Feature spacing increases along odd-symmetry boundaries (between elevated and recessed grating regions, represented by dark and light) with distance from the center. Relatively narrow (wide) segment spacing works better for relatively high (low) frequencies. Curved boundaries of odd symmetry 1505 extend radially from the center of the grating to the periphery, radiating out between the dark (elevated) and light (recessed) arms near the center. The curved boundaries are obscured by grating features in FIG. 15A, so the shapes of boundaries 1505 are depicted in FIG. 15B for ease of review. Boundaries 1505 create light and dark curtains, as noted in connection with FIGS. 14A and 14B, to cast patterns of curved lines on the underlying photodetector.

The segment widths do not continue to increase with radius, as there is a maximum desired width for a given wavelength band of interest (e.g., the widest may correspond to the lowest frequency of visible red light). The features that define boundaries 1505 therefore exhibit discontinuities as they extend toward the periphery of grating 1500. In this example, grating 1500 has three discrete areas each tuned to a subset or all of the wavelengths in the band of interest.

Figure 16:
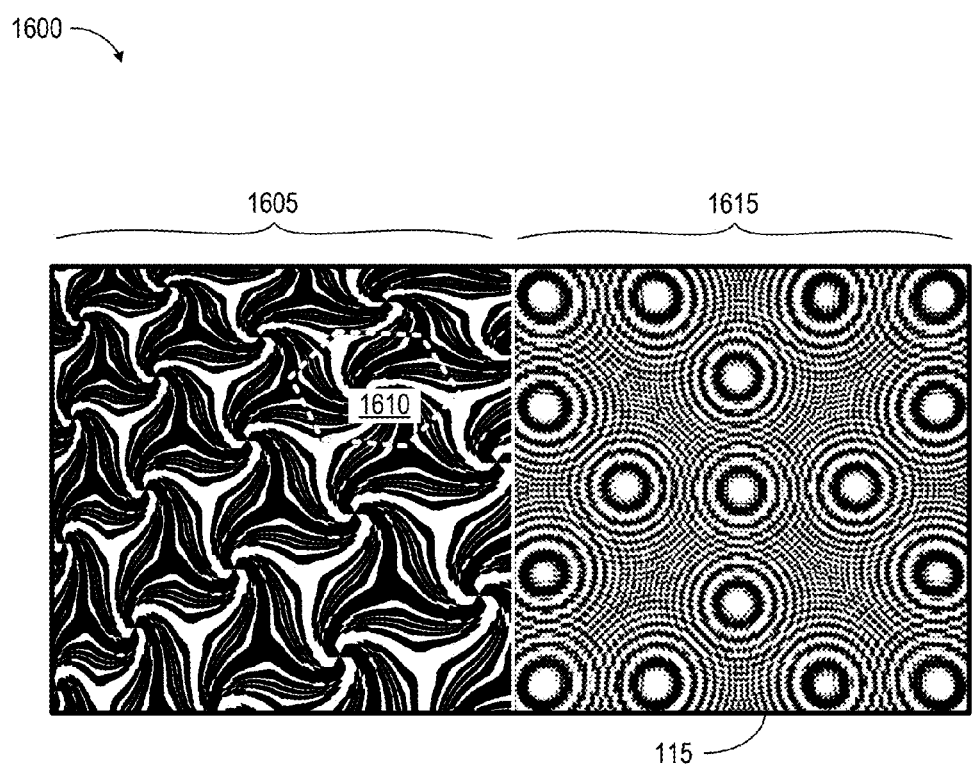
FIG. 16 is a plan view of a grating 1600 in accordance with yet another embodiment.

FIG. 16 is a plan view of a grating 1600 in accordance with yet another embodiment. Scenes and scene features may be better resolved using constellations of points rather than patterns of straight and/or curved lines, or vice versa, and combining both points and lines yields more descriptive information to resolve an image. Grating 1600 includes two grating regions, a first region 1605 of tessellated diffraction-pattern generators 1610 and a second region 1615 with a grating 115 of the type detailed above in connection with FIG. 1. Region 1605 produces a pattern of lines and region 1615 a pattern of points responsive to the same scene, and these patterns are captured by an underlying array of photoelements (not shown).

Region 1605 is a tesselated pattern of spiral gratings 1610, each spiral having characteristics of spiral grating 1500 of FIG. 15 but shaped to tessellate more efficiently. Gratings 1610 have diverse shapes to produce diverse data representing the same incident scene. Such tessellation has various advantages, area efficiency among them, though a single spiral (e.g., grating 1500) can be used in other embodiments.

Features of regions 1605 and 1610 are not necessarily to scale, and each can include more or fewer features or occupy relatively more or less of the area of grating 1600. The properties of region 1605 and other examples are detailed in the above-incorporated reference to Gill and Stork entitled "Optical Sensing of Nearby Scenes with Tessellated Phase Anti-Symmetric Phase Gratings."

Other Diffractive Structures

Each of the foregoing examples is illustrated in connection with gratings that employ overlapping, elliptical phase or zone plates. Other diffractive structures can be used in other embodiments. For example, gratings can be rectangular zone plates, fractal zone plates, fractal photo sieves, Fibonacci zone plates, or combinations of these or other diffractive structures. Discrete or tessellated anti-symmetric phase gratings detailed in the above-incorporated applications can also be used, as will be evident to those of skill in the art.

While the subject matter has been described in connection with specific embodiments, other embodiments are also envisioned. For example, some embodiments may use special materials, such as nano-particle-infused transparent media. Still other variations will be evident to those of skill in the art. Therefore, the spirit and scope of the appended claims should not be limited to the foregoing description. Only those claims specifically reciting "means for" or "step for" should be construed in the manner required under the sixth paragraph of 35 U.S.C. §112.

What is claimed is:
1. An imaging device comprising:
 a. an image sensor; and
 b. a grating integrated with and overlying the image sensor, the grating including:
  i. a first zone plate having:
   (a) first zones of alternating first and second phase retardations; and
   (b) second zones of the alternating first and second phase retardations; and
  iii. a second zone plate overlapping the first zone plate over an area of overlap, the second zone plate having:
   (a) first zones of the alternating first and second phase retardations; and
   (b) second zones of the alternating first and second phase retardations;

iv. wherein, in the area of overlap, the first zones of the first zone plate and the first zones of the second zone plate are deemphasized relative to the second zones of the first zone plate and the second zones of the second zone plate.

2. The device of claim 1, wherein the first zones are lower-order zones and the second zones are higher-order zones.

3. The device of claim 1, wherein the first zones are higher-order zones and the second zones are lower-order zones.

4. The device of claim 1, wherein the first zones of the first zone plate have a first areal density in the area of overlap and the second zones of the second zone plate have a second areal density greater than the first areal density in the area of overlap.

5. The device of claim 4, wherein the first zones of the second zone plate have the first areal density in the area of overlap and the second zones of the first zone plate have the second areal density greater than the first areal density in the area of overlap.

6. The device of claim 4, wherein the first areal density of a given one of the first zones of the first zone plate is proportional to the area of the given one of the first zones of the first zone plate and inversely proportional to the area of an ideal version of the given one of the first zones of the first zone plate uninterrupted by the second zones of the second zone plate.

7. An imaging device comprising:
an array of photoelements; and
overlapping and dissimilar diffractive structures overlying the array and each having an area at least 10 times the area of one of the photoelements, each diffractive structure including alternating concentric first and second zones best focusing light onto the array of photoelements over a respective different range of incident angles;
the first and second zones of each diffractive structure interrupted in areas of relative focal consequence to an overlapping diffractive structure;
wherein the diffractive structures are arranged in a plane parallel to the array of photoelements, the imaging device further comprising an actuator to move the diffractive structures laterally with respect to the plane while maintaining a separation between the photoelements and the plane.

8. The imaging device of claim 7, further comprising a light-transmissive medium allowing light incident adjacent ones of the diffractive structures to intersect the same one of the photoelements.

9. The imaging device of claim 7, wherein the ranges of incident angles overlap, the imaging device further comprising an aperture spaced from the array of photoelements to constrain an outer bound of the overlapping incident angles.

10. The imaging device of claim 9, further comprising a second aperture spaced from the aperture along an axis normal to the array.

* * * * *